United States Patent [19]
Fuller et al.

[11] Patent Number: 5,605,767
[45] Date of Patent: Feb. 25, 1997

[54] HARDENED AND FIRE RETARDANT WOOD PRODUCTS

[75] Inventors: B. Shannon Fuller, Nashville, Tenn.; W. Dale Ellis, McFarland; Roger M. Rowell, Madison, both of Wis.

[73] Assignee: Triangle Pacific Corporation, Dallas, Tex.

[21] Appl. No.: 594,635

[22] Filed: Feb. 2, 1996

Related U.S. Application Data

[63] Continuation of Ser. No. 574,469, Dec. 8, 1995, which is a continuation of Ser. No. 74,772, Jun. 9, 1993, abandoned.

[51] Int. Cl.$^6$ .................................................. B32B 23/08
[52] U.S. Cl. ................................... 428/514; 428/537.1
[58] Field of Search ................................ 428/514, 537.1

[56] References Cited

U.S. PATENT DOCUMENTS

| | | | |
|---|---|---|---|
| 2,867,543 | 1/1959 | Braun | 427/227 |
| 3,160,515 | 12/1964 | Goldstein et al. | 427/337 |
| 3,285,774 | 11/1966 | Goldstein et al. | 427/397 |
| 3,639,191 | 2/1972 | Bader | 156/284 |
| 3,661,633 | 5/1972 | Moren | 428/541 |
| 3,663,261 | 5/1972 | Miettinen et al. | 427/499 |
| 3,787,344 | 1/1974 | Kenaga et al. | 260/28.5 |
| 3,790,401 | 2/1974 | Maine | 117/59 |
| 3,958,072 | 5/1976 | Araki et al. | 428/414 |
| 3,968,276 | 7/1976 | Allen | 117/59 |
| 4,031,276 | 6/1977 | Nakamura et al. | 427/369 |
| 4,057,658 | 11/1977 | Sjoo et al. | 427/499 |
| 4,212,928 | 7/1980 | Arney | 428/511 |
| 4,250,214 | 2/1981 | Broxterman et al. | 428/514 |
| 4,276,329 | 6/1981 | Vasishth et al. | 427/393 |
| 4,291,101 | 9/1981 | Tanizaki et al. | 428/514 |
| 4,304,820 | 12/1981 | Deubzer et al. | 428/452 |
| 4,307,155 | 12/1981 | Broxterman et al. | 428/514 |
| 4,421,782 | 12/1983 | Bolgiano et al. | 427/53.1 |
| 4,686,251 | 8/1987 | Ostermann et al. | 523/448 |
| 4,764,420 | 8/1988 | Gluck et al. | 428/317 |
| 4,789,604 | 12/1988 | van der Hoeven | 428/503 |
| 4,804,384 | 2/1989 | Rowell et al. | |
| 5,098,973 | 3/1992 | Kozuka et al. | 526/282 |

FOREIGN PATENT DOCUMENTS

| | | |
|---|---|---|
| 377996 | 5/1985 | Austria . |
| 160815 | 10/1975 | Czechoslovakia . |
| 161295 | 11/1975 | Czechoslovakia . |
| 2069273 | 10/1971 | France . |
| 1953236 | 7/1970 | Germany . |
| 2123353 | 2/1972 | Germany . |
| 48-056806 | 8/1973 | Japan . |
| 48-056295 | 8/1973 | Japan . |
| 51-095106 | 8/1976 | Japan . |
| 51-095107 | 8/1976 | Japan . |
| 57-159652 | 10/1982 | Japan . |
| 59-055705 | 3/1984 | Japan . |
| 59-101388 | 6/1984 | Japan . |
| 60-108474 | 6/1985 | Japan . |
| 60-147303 | 8/1985 | Japan . |
| 60-149402 | 8/1985 | Japan . |
| 60-203402 | 10/1985 | Japan . |
| 61-103576 | 5/1986 | Japan . |
| 61-171306 | 8/1986 | Japan . |
| 62-184803 | 8/1987 | Japan . |
| 62-249707 | 10/1987 | Japan . |
| 63-077703 | 4/1988 | Japan . |
| 63-141739 | 6/1988 | Japan . |
| 01196302 | 8/1989 | Japan . |
| 01267001 | 10/1989 | Japan . |
| 02307703 | 12/1990 | Japan . |
| 63007302 | of 1991 | Japan . |
| 7005148 | 3/1971 | South Africa . |
| 455021 | 3/1975 | U.S.S.R. . |
| 521133 | 7/1976 | U.S.S.R. . |

OTHER PUBLICATIONS

A. E. Witt et al. Radiat. Phys. Chem., vol. 8, No. 1–2 (no month) 1981 Acrylic Woods in the United States.

Honda et al. Proc. Jpn Cong Mater Resp, 316–320, 1978 (no month) Effect of Impregnants Utilized in Fire–Retardant Wood–Polymer Composite.

Handa et al. Proc. Jpn Mater Res, pp. 304–310, Oct. 1977 Dynamic Viscoelasticity of Wood–Polymer Composite: Studies on the Mode of Polymer–Wood Interaction.

Lan et al. Forest Products Journal V. 28, pp. 36–39 Feb. 2, 1978 Effect of the Addition of Waxes to Wood–Polymer Composite.

Beall et al. Forest Products Journal, vol. 23, pp. 56–60 Jan. 1, 1973 Hardness and Hardness Modulus of Wood–Polymer Composites.

Handa et al. Proc of 15th Jap Congr on Mater Res, pp. 158–163 Sep. 1971 Physical Properties of Wood–Polymer Composite Materials Prepared by I. C. T–Type Electron Accelerator.

Juncna et al. Forest Products Journal, vol. 20, pp. 24–28 Dec. 12, 1970 Properties of Thermo–Catalytically Prepared Wood–Polymer Composites.

Handa et al. Polym. Sci. Technol. vol. 20, pp. 167–190 (no month) 1983 Polymer–Performance on the Dimensional Stability and the Mechanical Properties of Wood–Polymer Composites Prepared by an Electron Beam Accelerator.

Rowell et al. Wood Sci., vol. 15, 90–96 (no month) 1982 Wood–Polymer Composites: Cell Wall Grafting with Alkylene Oxides and Lumen Treatments with Methyl Methacrylnic.

(List continued on next page.)

Primary Examiner—Mark D. Sweet
Attorney, Agent, or Firm—W. Thad Adams, III, P. A.

[57] ABSTRACT

Wood products impregnated with from 30 to 80% of a polymerizable monomer selected from the group consisting of hexanediol diacrylate and hexanediol dimethacrylate have excellent indent resistance. The wood products are impregnated with the monomer solution by placing the wood under a vacuum to remove air, contacting the wood with a monomer solution containing a polymerizable hexanediol diacrylate and/or hexanediol dimethacrylate monomer and from 0.5 to about 2 percent of a thermally activated free radical source as a polymerization initiator for a period sufficient to achieve the desired polymer loading. The wood is then heated under pressure to polymerize or cure the monomers.

5 Claims, 2 Drawing Sheets

OTHER PUBLICATIONS

Kanagawa Wood Fiber, vol. 2, 40–51 (no month) 1970 Heat Cure of High Boiling Styrene–Type Monomers in Wood.

Zieberman For. Prod. J., vol. 25, pp. 21–25, 2975 (no month) 1975 Use of Synthetic Polymers for Decreasing the Wood Flammability.

Slau et al, Wood Sci., vol. 8, pp. 375–383 (no month) 1975 Fire Behavior of Treated Wood and Wood–Polymer Composites.

Sinu et al. Forest Prod. J., vol. 22, pp. 31–36 1972 (no month) Fire–Tube Tests of Wood–Polymer Composites.

Chan et al. Radiat. Phys. Chem., vol. 33, pp. 197–204 1989 (no month) Thermal Characteristics of Rubberwood–Polymer Composites.

Zhou *Appl. Radiat Lab* vol. 1, pp. 60–66 (no month) 1983 Radiation Curing of Coating on Wood Surfaces.

Micko et al. J. Radiat. Curing. vol. 2, pp. 19–24 (no month) 1975 Accelerated Radiation Polymerization of Vinyl–Divinyl Comonomer Systems.

Schaudy et al. Oesterr. Forschungazenl. Sibersdorf. No. 4102, 28 pages (no month) 1981 Wood–Plastic Composites with High Toughness and Dimensional Stability.

Narnyan et al. 1985 International Symposium on Wood Pulping Chemistry, Vancouver, BC, Canada Aug. 26–30 1985 Polymer–Performance Preparation of Wood–Polymer Composites Using Anionic Polymerization Techniques.

Du Plessis et al. Atomic Energy Board, Pretoria, South Africa Apr. 1, 1977 Partial Impregnation Techniques in the Production of Wood–Polymer Composites Through Gamma Irradiation.

Vigsorovich et al. Khim. Derv., vol. 3, pp. 91–98 1984 (no month) Impregnation of the Wood Component Materials with Polymer Binders.

Aho et al. Valtion Tek. Tutkinmuslaltos, Sar. 1, No. 56 1972 (no month) Decay Tests on Wood–Polymer Combinations.

Ahmed et al. Nippon Genshiryoku Kenkyusho Nempo, 5027, pp. 82–90 (no month) 1971 Fire–Retardant Wood–Polymer Composite Based on Radiation–Induced Polymerization of Phosphorous–Containing Vinyl Monomers Particularly Bis(2–chloroethyl) vinylphosphonate.

I.VII, Gotoda et al. Nippon Genshiryoku Kenkyusho Nempo, JAERI 5027, pp. 94–100 1970 (no month) 1970 Preparation of Wood–Polymer Composite by Ionizing Radiation.

St. Clair Proc, Amer. Wood–Preserv. Ass., vol. 65, 250–9 1989 (no month) Leach Resistant Fire–Retardant Treated Wood for Outdoor Exposure.

Handa et al. Proc. Jpn. Congr. Mater. Res., vol. 18, pp. 182–188 (no month) 1975 Combustion Characteristics and the Smoking behavior of Fire–Retarded Materials.

Lubke et al. Zesz. Probl. Postepow Nauk Roin., vol. 2, pp. 281–282 (no month) 1983 Combustibility of Lignoplastic Materials.

Kitamura et al. Rinsenhikenio, vol. 3, pp. 4–8 1974 (no month) Properties of Fire–Retardant Impregnated Plywoods.

Proksch et al. Ber. Oesterr. Studienges. Atomenerg., Ch–11, 9 p. 1972 (no month) Choice of Suitable Pigments for the Radiochemical Production of Wood–Plastic Combinations.

Ruyter et al. Dent. Mater., vol. 3, p. 315 21 1987 (no month) Monomers and Fuller Content of Resin Based Crown and Bridge Materials.

Schaudy et al. Parts 1, 2 and 3 *Oesterr Forschungszent. Schibersdorf,* OEFZS, 43 pages 1986 (no month) Radiation Curable Impregnating Agents for Conservation of Archaeologic Wooden Objects.

Chia et al. Radiat. Phys. Chem., vol. 26, pp. 423–432 (no month) 1985 A Preliminary Study on the thermal Conductivity and flammability of WPC based on some Tropical Woods.

Nikolov et al. Zesz. Probl. Postepow Nauk Roin., vol. 260, pp. 293–301 (no month) 1983 Fireproofing of Modified Fir Wood.

Handa et al. Mokuzai Gakkaishi, vol. 25, pp. 600–609 (no month) 1979 Syngergistic Effect of Tetrakis(hydroxymenthyl)phosphonium Chloride and ammonium bromide on the Flame and Smoke Retardancy of Phenol–WPC.

Iya et al. Radiat. Phys. Chem. vol. 12, pp. 107–110 (no month) 1978 Development of Radiation Processed Wood Polymer Composites Based on Tropical Hardwoods.

Autio et al. Forrst Prod. J., vol. 20, pp. 36–42 (no month) 1970 Experiments in Finland on Properties of Wood–Polymer Combinations.

Sosin et al. Izv. Vyssh. Uchebn. Zaved., vol. 2, pp. 85–88 (no month) 1979 Protective Coatings for Wood.

Handa et al. Proc. Jpn. Congr. Mater. Res, vol. 23, pp. 333–337 (no month) 1980 Effect of the Mechanical Structure on the Combustion Behavior in the Phenol–Fire Retardants–WPC.

Shutov et al. Derewoobr. Promyshl. (no month) 1980 "Fire Resistant Modified Wood".

HARDENED AND FIRE RETARDANT WOOD PRODUCTS

This application is a continuation application under 37 C.F.R. 1.60 of prior U.S. application Ser. No. 08/574,469 filed on Dec. 8, 1995 which is a 1.62 Continuation Application of U.S. Ser. No. 08/074,772 filed on Jun. 9, 1993 now abandoned.

TECHNICAL FIELD

The present invention relates to hardened and fire retardant wood products and a method of chemically treating wood to increase its hardness and fire retardant properties.

BACKGROUND OF THE INVENTION

Wood possesses many desirable physical properties which make it an ideal material for many different applications. As compared to other building materials, wood is generally structurally strong, may be finished to a pleasing appearance and is easily shaped. Though a desirable material, wood has several physical properties which have limited its use in a number of different applications. These properties include the relative softness of wood, its typical non-uniform density and flammability.

Due to wood being an anisotropic material, i.e. the properties of wood are different in all three directions in which a tree grows, the specific gravity of wood may vary from 0.3 to over 1 depending on a number of factors. These factors include the particular species of wood, whether the wood is latewood (grown in the summer and early fall), summerwood (grown in the spring), heartwood or sapwood, the extractable content, mineral content, and other factors. Since the hardness of a wood surface is directly related to its specific gravity, the variability in specific gravity results in a wide variability in surface hardness. If a floor were made of oak, for example, the more dense latewood may have a specific gravity of approximately 0.7 whereas the less dense earlywood could have a specific gravity of approximately 0.5. The range of specific gravities is even wider in other species of wood Uniformity in hardness is especially desirable for wood that is used as a flooring material since soft spots in wood flooring are particularly vulnerable to permanent indentation resulting from the application of localized pressure. For example, a localized pressure of 100 pounds per square inch (psi) may result in an indentation in the earlywood of most wood species.

The pressure exerted on the surface of a wood floor varies with the size and weight of object in contact with the floor. For example, a person weighing 150 pounds wearing shoes with a 0.5 inch by 0.5 inch (normal high heal), may exert a pressure of up to 600 psi on the surface beneath the heel. The same 150 pound person wearing shoes with 0.25 inch by 0.25 inch (stiletto) heels may exert up to approximately 2400 psi on the surface beneath the heel, resulting in a permanent indentation. An exposed nail in a shoe heel with a much smaller surface area, can cause even more damage to a wood floor. For example, the same 150 pound person with an exposed nail having a diameter of 0.5 min. can exert a specific pressure of 387,000 psi beneath the nail.

Several approaches have been taken in the past in attempts to harden wood surfaces. These attempts have included the application of surface coatings such as varnishes and impregnation of the wood with various materials. When hardness is achieved through a surface coating the ultimate hardness of this system is still controlled by the hardness of the wood under the coming. When indentation occurs on this surface, it may be more visible in a surface coated system than an uncoated surface due to the change in the refraction of the glossy coating. There have been attempts to harden wood surfaces by impregnating the wood with various materials such as methyl methacrylate with varying degrees of success. In the case of methyl methacrylate, however, the amount of polymer absorbed by the wood is limited. Moreover, since methyl methacrylate is a relatively volatile material, it may be lost through evaporation.

All of the components of wood, cellulose, hemicelluloses, lignin, and extractables undergo thermal degradation. If enough heat and oxygen are provided, wood will burn. Thus, in order to meet the demands of many applications, wood must be treated with a fire retardant.

Although various methods have been proposed to treat wood to promote hardness or to provide fire retardancy, in general the prior art methods present numerous deficiencies. In some cases the treatment does not give uniform hardness, in other cases the treatment does not provide a surface hard enough to be used for flooring and similar applications. Some treatments do not provide for staining in combination with treatment with hardening chemicals. Other treatments change the natural appearance of the wood. Where the treated wood is used as a veneer, some treatments permit bleed through of the adhesive used to adhere the veneer to the core material. In still other cases, a fire retardant can not be used in combination with the chemicals used to harden the wood, or the treatment process is too expensive, complicated and time consuming. In yet other cases, the chemicals used to treat the wood have relatively low vapor pressures, resulting in the loss of chemicals during the treatment process and the generation of potentially noxious fumes.

Thus, there exists a need for a practical and economical method of treating wood to improve its hardness that also permits treatment to improve fire retardancy and provides for staining of the wood surface.

SUMMARY THE INVENTION

The present invention relates to the production of a hardened, fire retardant treated wood product for applications such as flooring where uniform hardness is desirable. In one embodiment of the invention, a wood product is produced by:

(1) impregnating wood, under vacuum, with a treating solution containing hexanediol diacrylate (HDDA) or hexanediol dimethacrylate (HDDMA) monomers and a free radical source as a polymerization initiator alone or in combination with a chlorinated flame or fire retardant with or without an organic dye or stain and draining excess treating solution from the wood;

(2) heating the impregnated wood product under pressure to promote polymerization or curing of the monomers.

In the practice of the present invention, wood is impregnated with compounds having the following formulas:

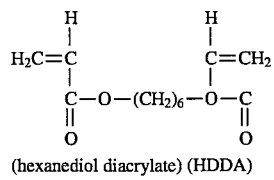

(hexanediol diacrylate) (HDDA)

-continued

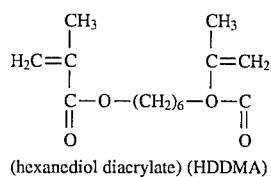

(hexanediol diacrylate) (HDDMA)

to produce wood products having superior hardness and indent resistance.

In one embodiment of the present invention, wood product in the form of veneer is impregnated with a solution of hexanediol diacrylate or hexanediol dimethacrylate monomer and a polymerization initiator alone, or in combination with a fire retardant and/or a stain or dye for a predetermined period of time. The veneer is removed from the treating solution, excess monomer is removed and the veneer is heated under pressure to cure or polymerize the monomers. Wood veneers treated in this way demonstrate greatly improved hardness and fire retardancy.

DETAILED DESCRIPTION OF THE INVENTION

In the practice of the present invention, the wood product is first placed under vacuum for a predetermined period to remove air. As used herein, the term "wood product" refers to products produced from solid wood such as veneers, boards, dowels and similar items shaped from solid wood. Preferably, the wood products to be treated have a moisture content below 20 percent by weight. Impregnation of the wood product is achieved more readily when the wood is dry, but complete dryness is not essential for the process.

Figure 1:
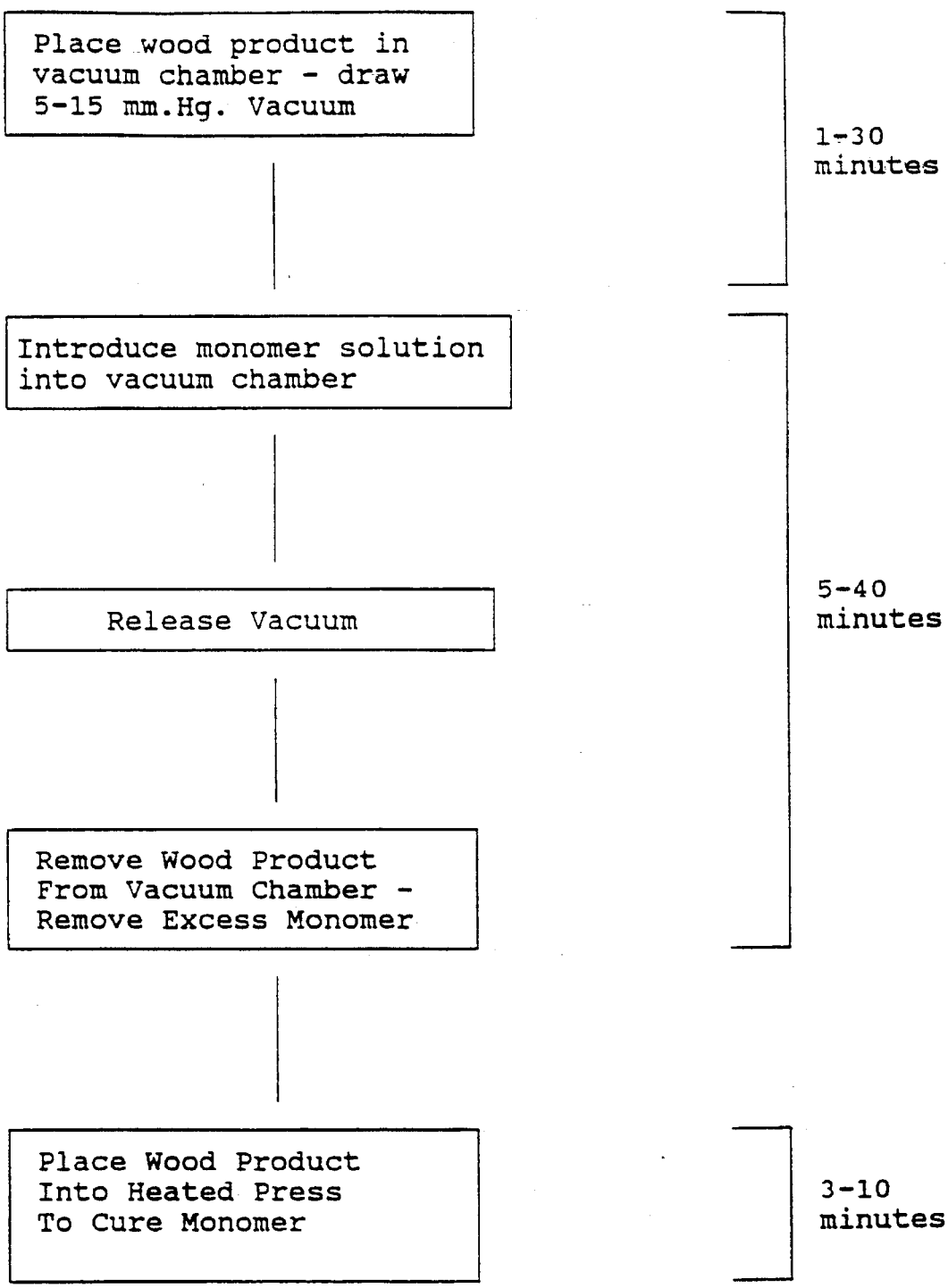
FIG. 1 is a schematic representation of the process of the present invention.

As schematically illustrated in FIG. 1, the wood product is subject to a vacuum of from about 5 mm. Hg. to about 15 min. Hg. for a period of from about 1 to 30 minutes. The amount of vacuum as well as the period during which the wood product is subjected to the vacuum can, however, be varied above and below these limits.

While still under vacuum, the wood product is then immersed in a solution of hexanediol diacrylate (HDDA) or hexanediol dimethacrylate (HDDMA) monomer and a polymerization initiator alone, or in combination with a flame or fire retardant such as chlorinated wax. A thermally activated polymerization initiator suitable for use in the practice of the present invention is 2,2'-Azobis-(2-methylbutyronitrile), commercially available from Dupont under the trade designation Vazo 67. Additionally, a dye, stain or other colorant can be added to the solution in an amount of 3 to 10 percent by volume.

The temperature of the monomer solution can be from 20 degrees up to 60 degrees C. Preferably, the wood is immersed in the solution for a period (soak time) sufficient to allow the polymer to absorb between about 30% to about 80% of monomer solution, based upon the weight of the untreated wood. In the case of veneers the soak time is preferably from about 5 to about 40 minutes. The soak time may, however, be varied above and below these limits depending upon the particular species of wood and the shape of the wood product.

Finally, the wood product is removed from the monomer solution and then heated under pressure to cure or polymerize the monomer. The temperature of the press can be from 90 to 180 degrees C. The duration of time in the press (cure time) for complete polymerization depends primarily on the temperature of the press and typically ranges from about 3 to about 10 minutes in the case of veneers. Again, the cure time may vary above and below these limits depending upon the particular species of wood and the shape of the wood product.

Depending on the type and size of the wood product to be treated, and the total processing to a final product, different process alternatives can be adopted. Wood in the form of veneers is a typical wood product amenable to treatment with the process of the present invention. Thicker wood materials can also be used in this process if the vacuum and atmospheric soaking times are extended.

In some applications, such as multiple layer laminated wood veneers, it may be desirable to further increase resistance to fire. If this is the case, fire retardancy can be further improved by treating the wood product with an aqueous solution of water soluble inorganic fire retardants, such as boric acid, diammonium phosphate, or ammonium borate.

Figure 2:
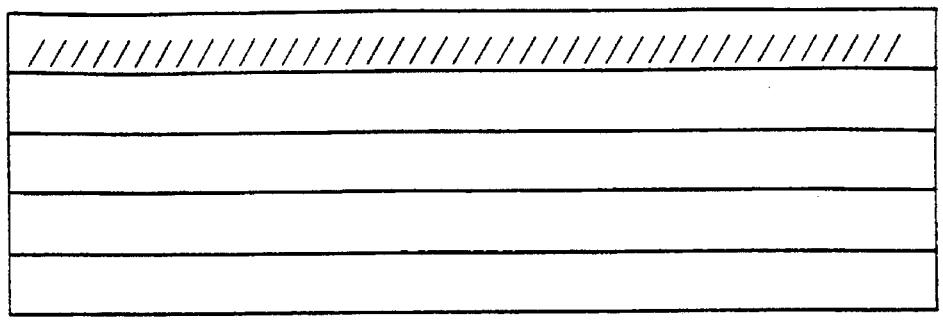
FIGS. 2 and 3 are cross sectional views of laminated wood products incorporating layers of wood treated in accordance with the present invention.
Figure 3:
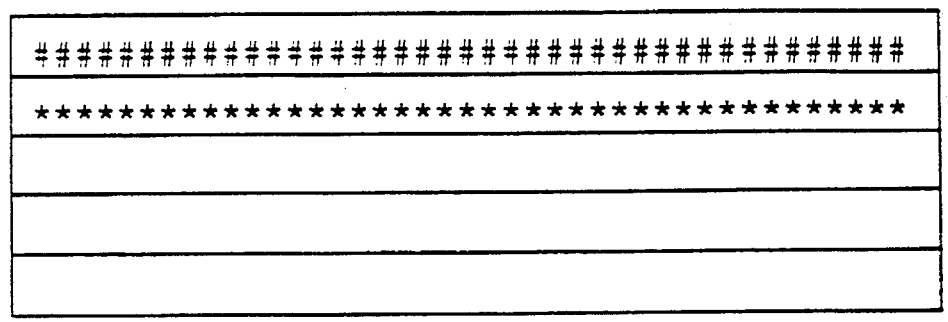

As illustrated in FIG. 2, in one embodiment of the present invention, a veneer 1 may be treated with an inorganic fire retardant such as diammonium phosphate prior to treatment with the monomer solution. The veneer may then be laminated to additional layers 2–5 of veneer. In another embodiment of the present invention, as illustrated in FIG. 3, a layer of veneer 7 treated with an inorganic fire retardant such as diammonium phosphate may be placed under a top ply 6 that has been treated with the monomer solution, Additionally, treatment with a fire retardant such as a chlorinated wax may be combined with the monomer treatment.

The treated wood product of the present invention exhibits greatly improved indent resistance as compared to untreated wood of the same type. As used herein, "indent resistance" is measured by the depth of an indentation formed when a wood product is tested with a Gardner impact apparatus with a indent force of 50 inch-lbs. Thus, lower values reflect higher indent resistance.

The present invention is believed to have several advantages over the prior art in treating wood products. The present invention provides: (1) a harder wood product than is presently used for flooring which may be treated to enhance its fire retardancy; (2) a wood product with uniform hardness throughout its surface; (3) with the addition of a dye or stain, a uniform color throughout the surface of the wood product; and (4) a practical, economical method of hardening a wood product which uses less volatile chemicals and may be accomplished in less time than prior art methods.

The invention will be further described with respect to the following examples; however, the scope of the invention is not to be limited thereby.

EXAMPLE 1

Northern Red Oak veneers were placed in a vacuum chamber and subjected to a vacuum of 9 mm Hg. for 15 minutes. The veneers of this and the following examples ranged from approximately 0.10 to 0.25 inches in thickness. While maintaining the vacuum, monomer was introduced into the chamber to cover the veneers. The vacuum was then released to return the pressure to atmospheric. The veneers were kept in the monomer for 30 minutes before they were removed and cured in a heated press at 100° to 120° C. and 200 psi for 3 to 4 minutes. The monomers used were hexanediol diacrylate (HDDA), hexanediol dimethacrylate (HDDMA) and methyl methacrylate (MMA). Each monomer contained 0.5% Vazo 67 as a polymerization initiator. Specimens were treated separately with each of the monomer solutions and indent resistance of the veneers was determined using a Gardner impact apparatus. An indent force of 50 inch-lbs was used to conduct the tests. Each test was repeated approximately 25 times. The results of treatment were as follows:

TABLE 1

Indentation Resistance of Oak Veneers Treated With Different Monomers

| Monomer | Polymer load (%) | Average Indentation (inch) |
| --- | --- | --- |
| HDDA | 46–48 | 0.014–0.018 |
| HDDMA | 43–45 | 0.015–0.026 |
| MMA | 13–22 | 0.022–0.026 |

The foregoing example illustrates the superior results obtained through the use of HDDA or HDDMA as compared to MMA. As illustrated in Example 1, polymer absorption was approximately twice as great for HDDA and HDDMA as opposed to MMA under the same process conditions. Indent resistance was also greater for the veneers containing HDDA and HDDMA than for the veneers containing MMA.

EXAMPLE 2

Northern Red Oak veneers were treated separately with HDDA and HDDMA by the method described in Example 1, except the method was varied to obtain a range of polymer loadings. The veneers were tested for indent resistance and the results are shown in Table 2.

TABLE 2

Indention Resistance of Treated Oak Veneers to Different Polymer Loadings

| Polymer Load (%) | Average Indentation (inch) |
| --- | --- |
| 0 | 0.040 |
| 16 | 0.030 |
| 33 | 0.026 |
| 43 | 0.020 |
| 48 | 0.018 |

The foregoing example demonstrates the relationship between polymer loading and indent resistance. As polymer loading increases, indent resistance also increases.

EXAMPLE 3

Northern Red Oak veneers were treated separately with HDDA and HDDMA, including 0.5% Vazo 67 as a polymerization initiator, by the method described in Example 1 to a treatment weight gain of 48 percent. The indentation resistance of earlywood and latewood was measured. The results are shown in Table 3 below:

TABLE 3

Indentation Resistance of Earlywood and Latewood of Oak Veneers

| Type of Wood | Average Indention (inch) |
| --- | --- |
| Earlywood | 0.019–0.025 |
| Latewood | 0.018–0.022 |

The foregoing example illustrates the uniform degree of hardness imparted to wood products treated in accordance with the present invention.

EXAMPLE 4

Northern Red Oak veneers were treated separately with HDDA and HDDMA, including 0.5% Vazo 67 as a polymerization initiator, as in Example 1, except the vacuum time was varied to determine the effect of vacuum time on polymer loading. The veneers were also allowed to soak for varying periods to determine the effect of soak time on polymer loading. The samples were tested for polymer loading and the results are set forth in Table 4 below:

TABLE 4

Vacuum Time and Soak Time vs. Polymer Loading

| Vacuum Time (minutes) | Soak Time (minutes) | Polymer Loading (%) |
| --- | --- | --- |
| 0 | 30 | 16 |
| 5 | 30 | 35 |
| 10 | 30 | 43 |
| 15 | 30 | 48 |
| 15 | 5 | 37 |
| 15 | 10 | 42 |
| 15 | 15 | 42 |
| 15 | 20 | 45 |
| 15 | 30 | 53 |
| 30 | 15 | 48 |
| 30 | 300 | 56 |

EXAMPLE 5

Northern Red Oak veneers were treated separately with HDDA and HDDMA, including 0.5% Vazo 67 as a polymerization initiator, and placed in a heated press at 100° C. and 200 psi for varying amounts of time to determine the effect of heating time on the polymerization of the monomer. To determine whether polymerization occurred, a thermocouple was placed in the press with the sample. Since the polymerization process is exothermic, a temperature rise above the press temperature indicated that the polymerization reaction was occurring. The results are set forth in Table 5 below:

TABLE 5

Time required to polymerize monomer in oak veneers.

| Time (min) | Polymerized |
| --- | --- |
| 0 | no |
| 1 | no |
| 2 | no |
| 3 | no |
| 4 | yes |
| 5 | yes |

EXAMPLE 6

Northern Red Oak veneers were placed in a vacuum chamber subjected to a vacuum of 9 mm Hg. for 15 minutes. While maintaining the vacuum, monomer was introduced into the chamber to cover the veneers. The vacuum was then released to return the pressure to atmospheric conditions. The veneers were kept in the monomer for 30 minutes before they were removed and cured in a press at 100° to 120° C. and 200 psi for 3 to 4 minutes. The monomer solutions used were HDDA and HDDMA with varying amounts of a chlorinated wax. Each monomer contained 0.5% Vazo 67 as a polymerization initiator. Specimens were treated separately with each of the monomer solutions and indent resistance of the veneers was determined using a Gardner impact apparatus. An indent force of 50 inch-lbs was used. The test results are set forth in Table 6 below:

TABLE 6

Indentation Resistance of Oak Veneers Treated With Solutions of HDDA and HDDMA With Chlorinated Wax

| Ratio of HDDA or HDDMA to Chlorinated Wax | Average Indentation (inches) |
|---|---|
| 85:15 | 0.021 |
| 75:25 | 0.017 |
| 70:30 | 0.019 |

The foregoing example illustrates that a flame retarding agent, such as a chlorinated wax, may be incorporated into the monomer solution without adversely affecting the ability of the solution to harden wood.

EXAMPLE 7

Northern Red Oak veneers treated as in Examples 1 and 6 were laminated to untreated veneers to form 5 ply boards, the treated veneer being the top veneer. The boards were then tested for flame spread in accordance with ASTM E162. The results are set forth in Table 7 below:

TABLE 7

Flame Spread on Polymer Treated Oak Veneers.

| Monomer Treatment | Flame Spread (%) |
|---|---|
| HDDA | 118 |
| HDDMA | 114 |
| HDDA or HDDMA with 15% Chlorinated Wax | 94 |
| HDDMA with 25% Chlorinated Wax | 82 |
| HDDA or HDDMA with 30% Chlorinated Wax | 85 |

EXAMPLE 8

Northern Red Oak veneers, treated as in Example 6, were laminated to 4 additional layers of red oak veneer and tested for flame spread. In the first test, the top ply was first treated with diammonium phosphate followed by the monomer treatment. In the second test, the top ply was monomer treated and the second ply was treated with diammonium phosphate. The boards were then tested for flame spread in accordance with ASTM E 162. The results are set forth in Table 8 below:

TABLE 8

Flame Spread on Polymer Treated Oak Veneers.

| Monomer Treatment | Flame Spread (%) |
|---|---|
| Top veneer treated with diammonium phosphate followed by treatment with HDDA or HDDMA with 30% Chlorinated Wax | 85 |
| Top veneer treated with HDDA or HDDMA with 30% Chlorinated Wax, second veneer treated with diammonium phosphate | 55 |

EXAMPLE 9

Northern Red Oak veneers were treated separately with mixtures of HDDA and HDDMA with 30% chlorinated wax as in Example 6. The veneers were then tested for indentation resistance of earlywood and latewood. The results are set forth in Table 9 below:

TABLE 9

Indentation Resistance of Earlywood and Latewood of Oak Veneers

| Type of Wood | Average Indention (inch) |
|---|---|
| Earlywood | 0.019–0.026 |
| Latewood | 0.016–0.022 |

EXAMPLE 10

Northern Red Oak veneers were treated separately with HDDA and HDDMA, including 0.5% Vazo 67 as a polymerization initiator and 30% chlorinated wax, using varying vacuum times to determine the effect of vacuum time on polymer loading. The veneers were also allowed to soak for varying periods to determine the effect of soak time on polymer loading. The samples were tested for polymer loading and the results are set forth in Table 10 below:

TABLE 10

Vacuum Time and Soak Time vs. Polymer Loading

| Vacuum Time (minutes) | Soak Time (minutes) | Polymer Loading (%) |
|---|---|---|
| 0 | 30 | 17 |
| 5 | 30 | 38 |
| 10 | 30 | 43 |
| 15 | 30 | 48 |
| 15 | 5 | 38 |
| 15 | 10 | 44 |
| 15 | 15 | 44 |
| 15 | 20 | 45 |
| 15 | 30 | 57 |

EXAMPLE 11

Northern Red Oak veneers were treated separately with HDDA and HDDMA, including 0.5% Vazo 67 as a polymerization initiator and 30% chlorinated wax, and placed in a heated press at 100° C. and 200 psi for varying amounts of time to determine the effect of varying heating times on the polymerization of the monomer. To determine whether polymerization occurred, a thermocouple was placed in the press with the sample. Since the polymerization process is exothermic, a temperature rise above the press temperature indicated that the polymerization reaction was occurring. Alternatively, visual inspection of the surface of the veneer for liquid monomer also indicated whether polymerization had occurred. The test results are set forth in Table 11 below:

TABLE 11

Time required to polymerize monomer in oak veneers.

| Time (min) | Polymerized |
| --- | --- |
| 0 | no |
| 1 | no |
| 2 | no |
| 3 | no |
| 4 | yes |
| 5 | yes |

EXAMPLE 12

Several hardwood and softwood veneers were treated as described in Example 1 with and without 30 percent chlorinated wax, with and without a 3 percent addition of a colorant. The monomer solution contained 0.5% Vazo 67 as a polymerization initiator. Specimens were treated separately and following polymerization, indent resistance of the veneers was determined using a Gardner impact apparatus. An indent force of 50 inch-lbs was used. The results are shown in Table 12.

TABLE 12

Indentation Resistance of Different Wood Treated Veneers

| Wood | Polymer Load (%) | Average Indentation (inch) | Untreated Control |
| --- | --- | --- | --- |
| Pecan | 70 | 0.012 | 0.028 |
| Ash | 65 | 0.014 | 0.030 |
| Cherry | 70 | 0.011 | — |
| Maple | 60 | 0.010 | 0.025 |
| Mahogany | 70 | 0.014 | — |
| Pine | 70 | 0.015 | 0.039 |
| Spruce | 70 | 0.017 | 0.039 |

While the particular embodiments of the present invention have been described, it will be apparent to those skilled in the art that various changes and modifications can be made without departing from the spirit and scope of the invention. The following claims are intended to cover all such modifications that are within the scope of the invention.

We claim:

1. A multiple ply board including at least one hardened ply comprising: wood impregnated with from 30% to 80% by weight based on the weight of the wood of a polymerized monomer selected from the group consisting of hexanediol diacrylate and hexanediol dimethacrylate.

2. The multiple ply board of claim 1 further comprising at least one ply treated with a flame retardant selected from the group consisting of boric acid, diammonium phosphate and ammonium borate.

3. The multiple ply board of claim 1 wherein at least one ply is treated with a monomer solution comprising 2 to 40 percent of a fire retardant.

4. The multiple ply board of claim 3 wherein the fire retardant is a chlorinated wax.

5. The multiply ply board of claim 1 wherein the hardened ply has an indentation resistance of from 0.01 to about 0.03 inches.

* * * * *